Oct. 3, 1967  G. L. BROWN ETAL  3,345,608
METHOD AND APPARATUS FOR ANALOG/DIGITAL
SEISMIC SIGNAL PROCESSING
Filed Nov. 15, 1965  5 Sheets-Sheet 1

INVENTORS
GRAYDON L. BROWN,
ROY E. GARTEN JR.
BY BOBBY J. THOMAS

William J. Miller
ATTORNEY

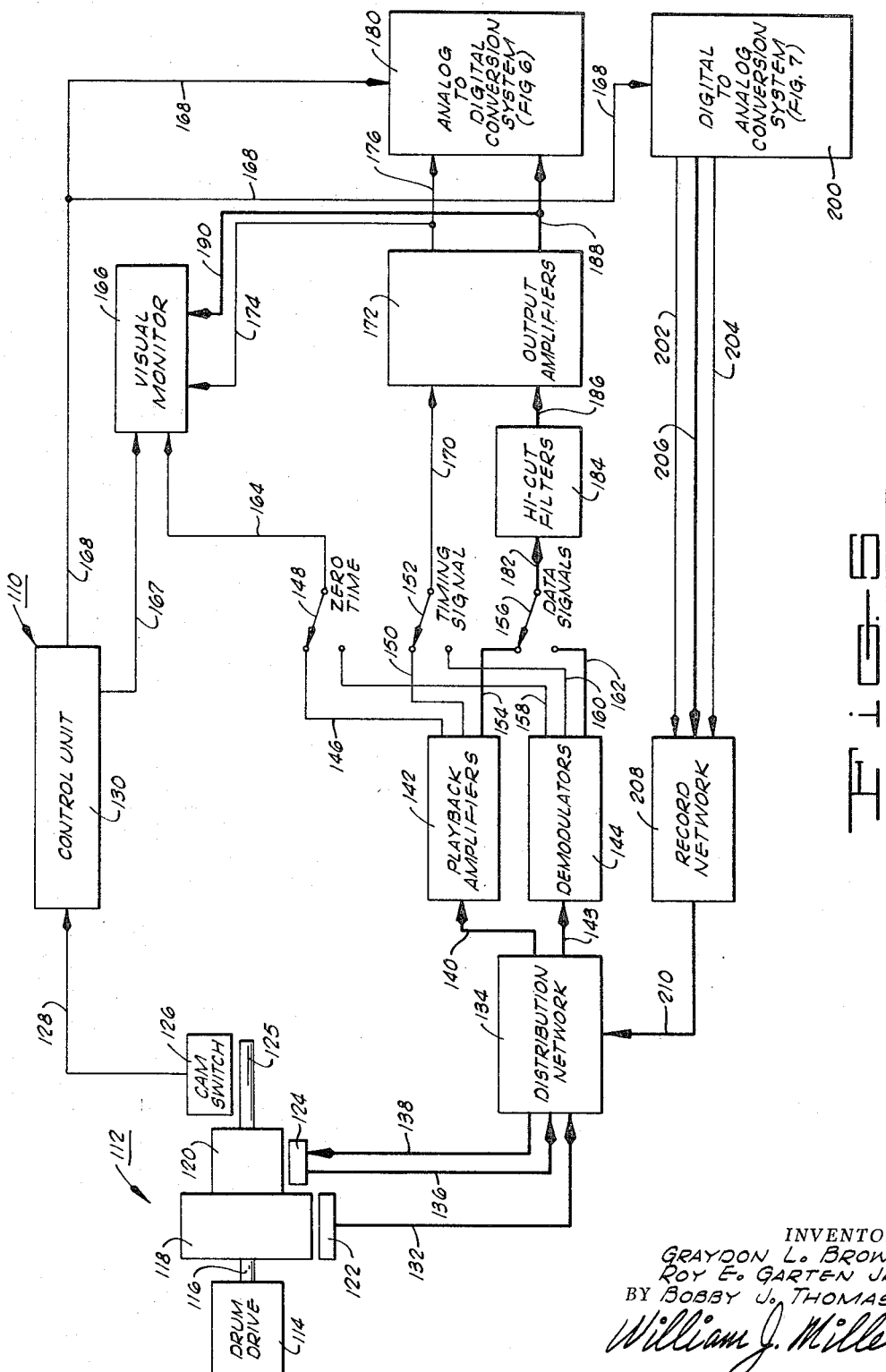

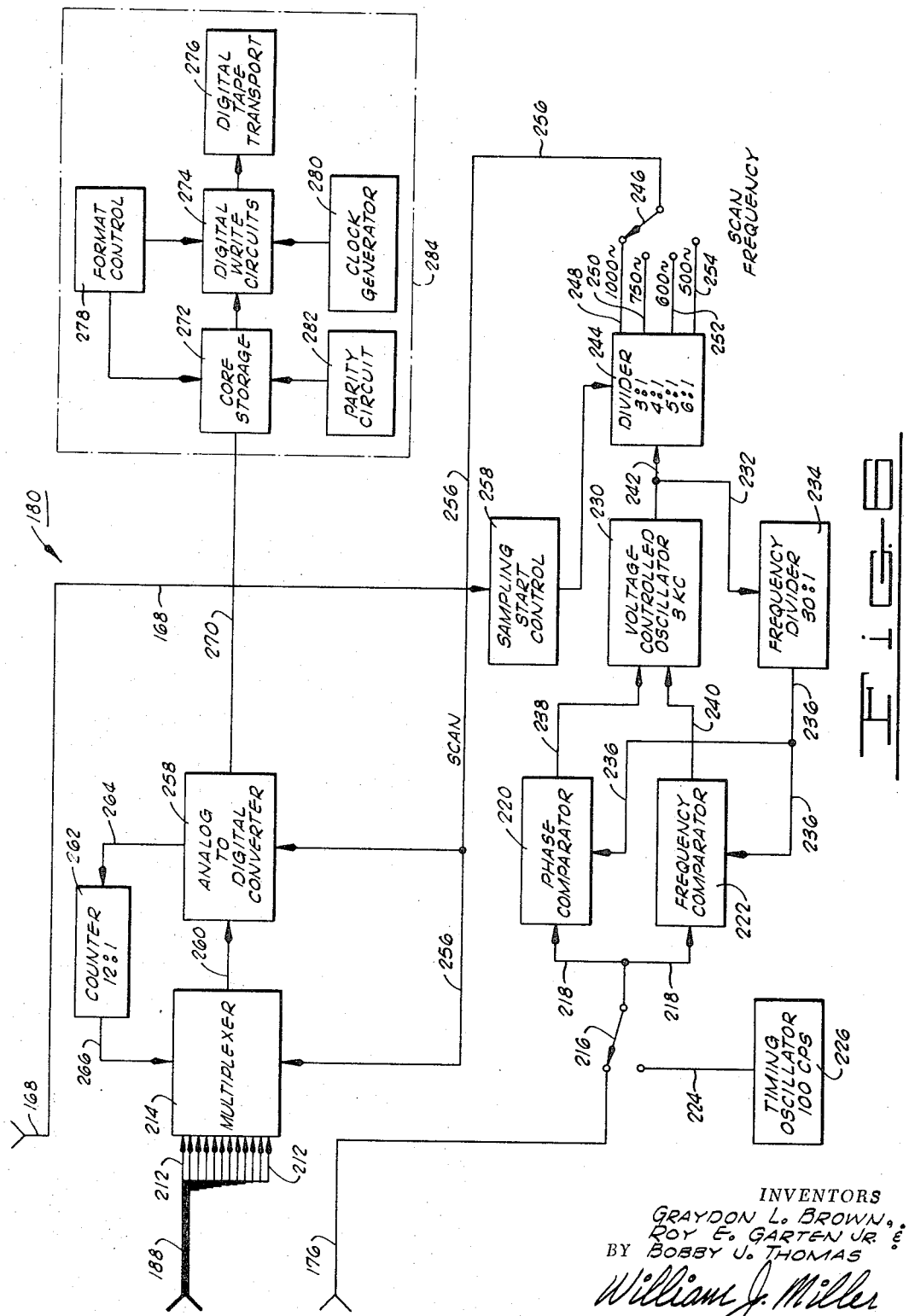

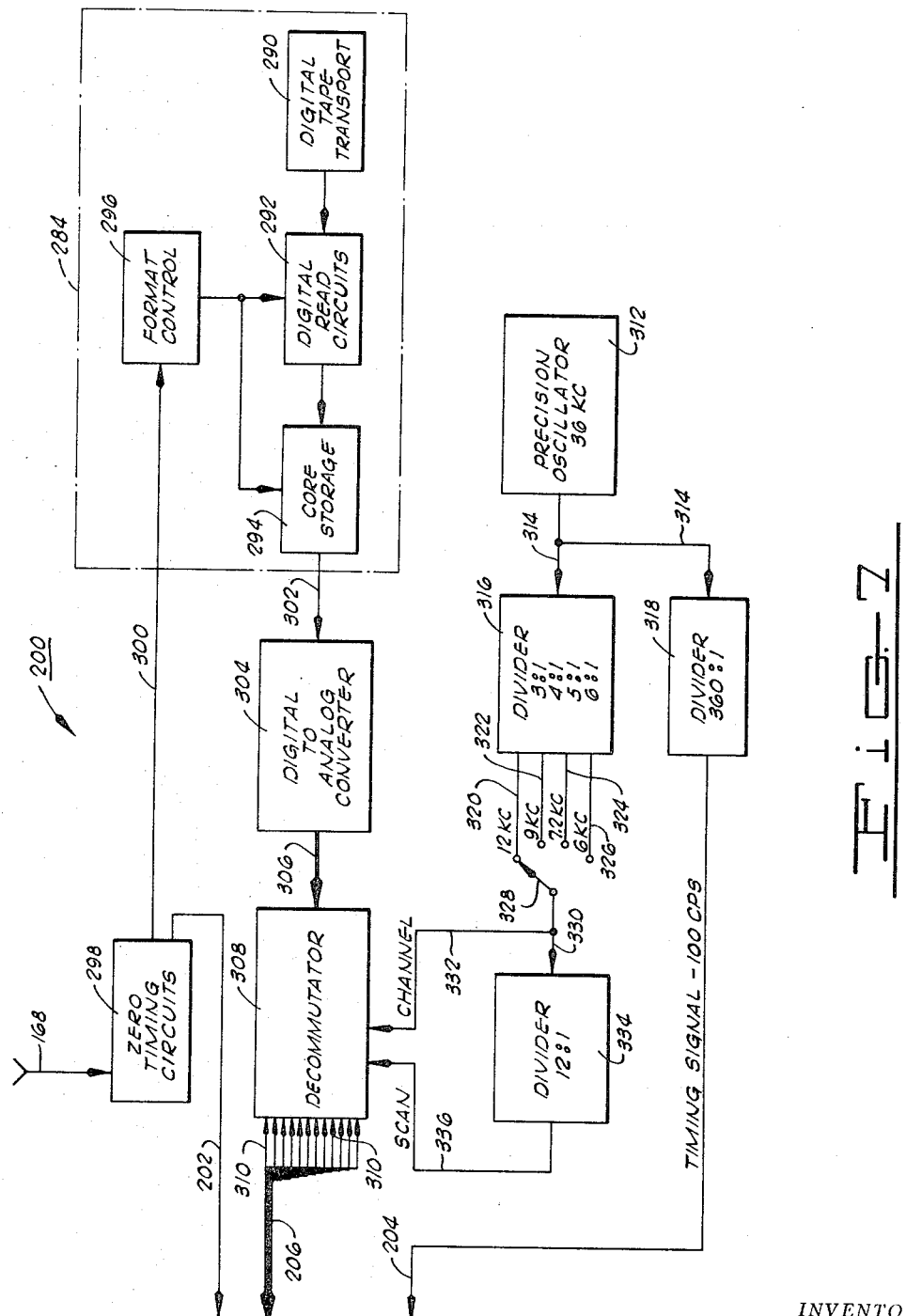

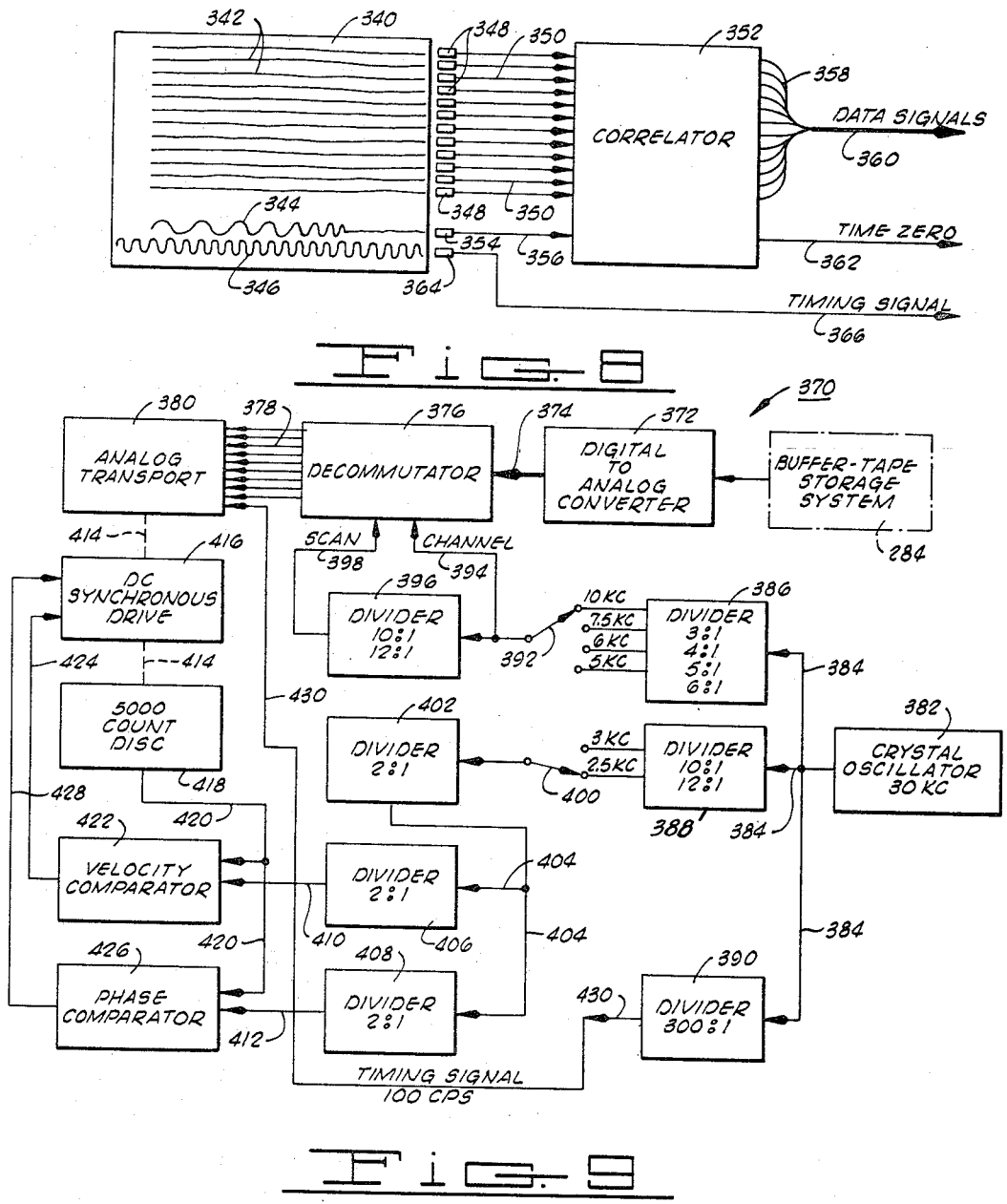

United States Patent Office 3,345,608
Patented Oct. 3, 1967

3,345,608
**METHOD AND APPARATUS FOR ANALOG/
DIGITAL SEISMIC SIGNAL PROCESSING**
Graydon L. Brown, Roy E. Garten, Jr., and Bobby J.
Thomas, Ponca City, Okla., assignors to Continental Oil
Company, Ponca City, Okla., a corporation of Delaware
Filed Nov. 15, 1965, Ser. No. 507,912
21 Claims. (Cl. 340—15.5)

ABSTRACT OF THE DISCLOSURE

Method and apparatus for seismic signal processing wherein multi-trace seismic records containing field recorded analog information is converted into a digital equivalent form for storage on magnetic tapes, the method and apparatus being reversible in that stored digital data may be reconverted to its analog form for recording as a conventional seismogram-type of analog record. The transitions between different forms of signal, i.e., analog-digital-analog, are carried out in a manner whereby the real time of segments of analog seismic information is preserved through the spatial distribution of equivalent digital information along the digital recording medium such that proper time-analog signals are recoverable for each seismic trace.

---

This invention relates to improvements in the art of processing and interpretation of geophysical records, and more particularly, but not by way of limitation, it relates to an improved method for conversion of multi-trace seismic records from analog to digital representation for enabling various digital processing measures, and it further includes the option of reconversion from digital to analog for subsequent storage and/or presentation.

The present invention contemplates a method wherein plural analog traces representing certain seismic signal returns can be multiplexed to a single time sequential analog voltage which is thereafter converted to a digital representation of the seismic returns. The digital representation of all traces of the seismic data input is then placed in buffer storage, whereupon it can be read out and applied to digital recording apparatus in such a manner that the actual time values of the individual, discrete seismic samples (in digital form) are retained in the form of their format placement on the digital recording tape. The method further includes the steps of playing back the digital information through a buffer storage facility with subsequent digital to analog conversion and demultiplexing of the information to provide plural channels of seismic information, each having the proper time relationship with respect to the time break or zero point of the respective seismic signal group.

The present invention further contemplates a system for reversibly carrying out the analog to digital to analog signal processing method as set forth above, the system including analog signal equipment for deriving plural channels of seismic information and thereafter amplifying and filtering the plural channels in required manner for application to an analog to digital section which operates to multiplex, convert analog to digital, and store in a novel manner, retaining predetermined time reference, for subsequent reconstitution for purposes of digital processing. A digital to analog section of the system can then be operated to retrieve stored digital information and reconstitute the plural trace analog information through buffer storage, digital to analog conversion and decommutation; and thereafter the analog processing equipment can be controlled to store or display the plural trace analog seismic information.

Therefore, it is an object of the present invention to provide a method of multiple seismic signal processing wherein the analog signal values can be converted into their digital equivalent values and stored in computer-compatible format such that the individual trace informations are retrievable in their proper order and relationship with respect to the time break or zero time of the particular seismic record.

It is a further object of this invention to provide apparatus for digitalizing multi-trace seismic data in a manner whereby the rate of sampling and multiplexing the multiple trace information is controlled by a precision timing reference to maintain an accurate time base for the data without the need for recording digital time values.

It is also an object of the invention to provide a system, including analog equipment, for reproducing field recorded seismic information in a proper form for application to digitalization apparatus in which various techniques of digital signal processing are carried out to extract geophysical information from the seismic record.

Finally, it is an object of the present invention to provide a method and apparatus which enables digitalization of a multi-trace seismic record and subsequent digital recording thereof in a manner whereby the real time or signal travel time relative to the time base of the original multi-trace seismic record is retained in the digital recording by means of the format or storage disposition of the successive digital values.

Other objects and advantages of the invention will be evident from the following detailed description when read in conjunction with the accompanying drawings which illustrate the invention.

In the drawings:

FIG. 5 is a block diagram of one system which is suitable for carrying out the method of the invention;

FIG. 6 is a block diagram of the analog to digital conversion system of FIG. 5;

FIG. 7 is a block diagram of the digital to analog conversion system of FIG. 5;

FIG. 8 is a diagram of associated equipment which may be employed for preparing vibration-type seismic records for processing in the system of FIG. 5; and FIG. 9 is a block diagram of an alternative form of digital to analog processing system.

Figure 1:
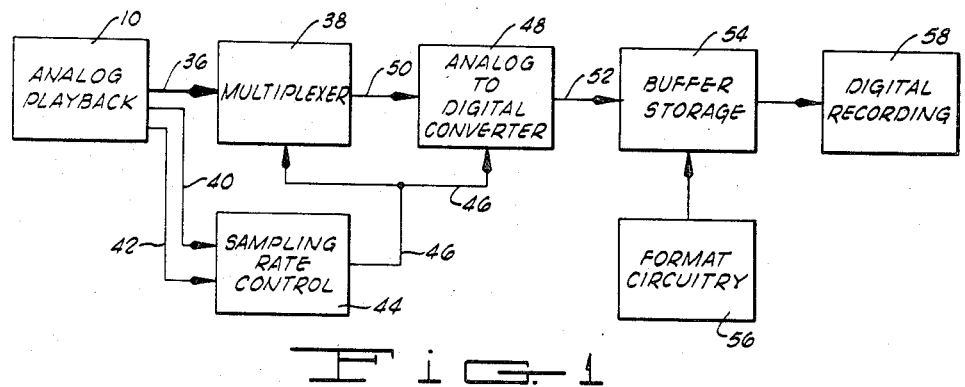
FIG. 1 is a functional block diagram illustrating the analog to digital phase of the method.

The block diagram of FIG. 1 illustrates the method in performance of the analog to digital function. The analog playback 10 may comprise conventional geophysical equipment for playing back multi-trace seismic records as recorded in the field. In this particular method, the record should include a plurality, or family, of seismic traces, as well as a trace indicating the time break or zero time of the shot sequence, and, third, a reference timing signal.

Figures 2, 3:
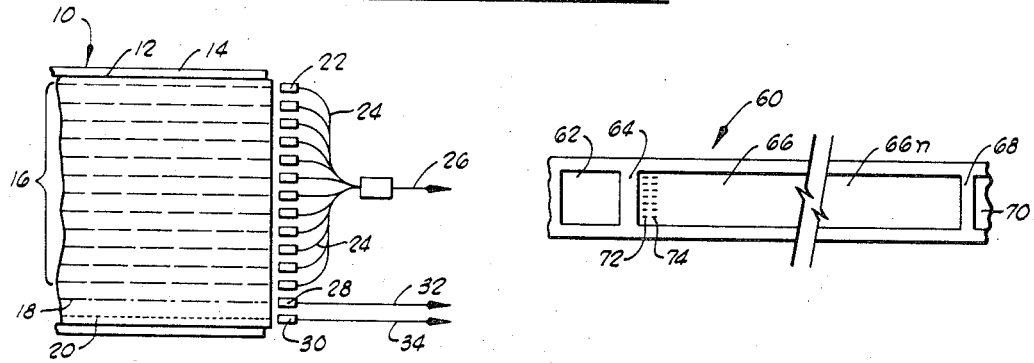
FIG. 2 illustrates a seismic field recording aligned for analog playback in accordance with the present invention.
FIG. 3 illustrates the digital tape and its general format.

FIG. 2 illustrates an exemplary type of analog play back device 10 which would provide suitable function. A recording belt 12, previously recorded in the field or in transference from some processing operation, is placed upon a recorder drive drum 14. The record or storage material 12 is shown here as having fourteen channels; however, the number and spacing of channels will depend upon the particular play back equipment, many conventional types of which are in field use. The record 12 shows twelve signal channels 16, twelve channels being a plurality often employed in geophysical work. There is also a channel 18 which carries a time break signal and a channel 20 upon which is recorded the reference timing signal.

A plurality of record transducers are then suitably affixed across the drum 14, each transducer being affixed in operative relationship to one of the signal channels on the record medium 12. Twelve transducers 22 are aligned for pick up of the plural seismic signals from record channels 16 to provide parallel outputs via leads 24 to cable or distribution output 26. The two remaining transducers, heads 28 and 30, are aligned for pick up from the time break channel 18 and the reference timing channel 20, respectively, thereafter providing separate outputs on leads 32 and 34. The reference timing signal is originally generated in the field as a constant frequency, e.g. 100 c.p.s.; this constant or fixed frequency voltage is then recorded on the field record (e.g. record 12 of FIG. 2). The analog record and transport apparatus of FIG. 2 is merely one of many equipments which could be used in the analog play back stage 10 (FIG. 1) to provide the requisite signal pick up, that is, the multi-trace seismic signals, the time break signal, and the timing signal.

Referring again to FIG. 1, the analog play back 10 provides three outputs, the heavy line 36 indicating the conduction of plural channel seismic signal information. Thus, the line 36 conducts each of the seismic trace outputs separately and in parallel to the input of a multiplexer 38. The lines 40 and 42 conduct the time break or zero time pulse and the reference timing signal to the sampling rate control 44. Sampling rate control 44 is started by the zero time pulse on input line 40 to generate a frame pulse output on line 46. The frame pulses are applied on line 46 to the multiplexer 38 and an analog to digital converter 48 to provide the proper timing or sampling rate, as will be described.

The timing signal input on line 42 provides a reference signal which is utilized to vary the sampling rate control 44 in proportion to any variation from the known reference frequency as would result from wow, flutter or other recording variation which may occur either in the analog play back 10 or the original analog recorder employed in the field. That is, any variations in field recording speed and/or the speed of analog play back 10 will be frequency modulated on the timing signal such that the variation can be detected and applied to vary the sampling rate control accordingly, whereby seismic signal real time will be continually re-established for those seismic samples passing through multiplexer 38 and the analog to digital converter 48. In practice, a 100 cycle per second timing signal has been utilized to excellent advantage.

The multiplexer 38 may be of a conventional type and the scanning rate from sampling rate control 44 on line 46 may be provided at any frequency capable of giving reliable sampling representation of the multiple values. For example, a scan rate of 1000 cycles would provide a good sampling of multi-trace seismic signals. This enables successive channel samples or scans from each channel of the plural analog trace signals each 1 millisecond to provide a time sequential analog voltage output on line 50 which is representative of all trace analog values in successive discrete samples. The successive samples are applied to the analog to digital converter 48, which is also controlled by the frame rate present on line 46, such that successive digital equivalent values for all analog voltage samples are present on a line 52 to a buffer storage 54.

The analog to digital converter 48 accepts the time sequential analog data on line 50 and digitizes in binary format, typically to 11 bits, including sign. This number is then divided into two parallel characters of 5 and 6 bits each, and the two characters are stored sequentially in the buffer storage 54 along with an odd parity bit for each character. The conversion time for each analog sample should not exceed a predetermined time which will allow sufficient maximum sampling rate in multiplexer 38.

The buffer storage 54 accepts the digital equivalent information on line 52 in serial character form, and the two character bit groups are then shifted through the buffer storage 54 under the control of format circuitry 56. Employment of buffer storage 54 provides a rate buffer or timing interface between the prior and later elements of the system. That is, the seismic information in electrical form is in synchronism with real or actual time through the analog playback 10, multiplexer 38 and the analog to digital converter 48; however, the buffer storage 54 effectively provides a translation of the time base to that which is provided by the format circuitry 56 in shifting information through the buffer storage 54. Buffer storage 54 may be an interlaced magnetic core buffer of well-known type, e.g., a 4096 x 8 core assembly.

The format circuitry 56 supplies suitable odd bit parity identification information to the buffer storage 54. It also supplies the proper clock pulses for shifting information through the buffer storage 54 and out of storage for acceptance by a digital recording stage 58. Digital recording stage 58 may be one of several types which are commercially available and have the capability of storing in the desired format. The tape is recorded in IBM compatible, binary format with each data value of 11 bits, including sign, plus a start of scan bit for channel one recorded in two sequential characters on the tape. Proper lateral parity may be written for each character. In addition, at the beginning of each digital record an identification word is recorded, preferably in binary coded decimal form, which indicates the particular seismic record contained in the digital file. The identification word may also contain other field information as to geographical location, recording specification and other pertinent processing information.

FIG. 3 shows a section 60 of the IBM compatible tape or digital data file which may be one-half inch tape on standard 10½ inch (diameter) reels. The section 60 merely shows one digital record of one portion of a seismic record while the digital tape reel may contain very many individual seismic information records. The block or area 62 represents the identification word space which may contain binary coded decimal information indicating the particular seismic record. This number is preferably recorded by six thumb wheel decimal switches and may be suitably displayed to the operator during playback of the entire record associated with that identification number. It is proposed that six additional decimal switches may be included for encoding other pertinent information in decimal format within the identification word block 62.

The identification word block 62 is followed by an inter-record gap 64 and thereafter the data value block 66. The number of blocks 66 or digital records per seismic record will be determined by the information content of the seismic record as will be further described. The last data value block 66n of the complete data value file is followed by an end of file gap 68; thereupon a new identification word block 70, pertaining to a new seismic record, is serially aligned.

In one form of digital tape 60 which is presently employed, the digital recording takes place as saturation positive or negative recording with 7 tracks in parallel, one track being used for parity or redundancy check. Thus, each data value or word of seismic information is recorded in two serial characters, of five and six bits each, including sign. This is a well known type of binary coded digital recording format for producing digital records which are compatible with various computer input systems. Block length spacing is employed; such, block length spacing has been set in multiples of 124 characters (60 data values or words) and with at least 3072 characters of six bits each on the tape. This practice obtains 84% tape utilization at 800 bits per inch.

The data value area or digital record 66 of tape section 60 will contain the data values for a portion of the multi-trace seismic records in sequential form and the number of digital records 66 to 66n per file will be determined by the real time length and information content of the seismic record itself. At the end of the recording time, longitudinal parity may be entered, if such is employed, and the proper end file gap 68 placed upon the record 60. Thus, each two parallel rows or character rows 72 and 74 of the data value area 66 would contain a discrete seismic data value from one of the multiple traces, and all data values as sequentially sampled in the multiplexer 38 would be sequentially aligned along the tape 60 in the digital data value record 66. Proper tape utilization may be enabled by tape generation of, for example, 556 bits per inch at a tape speed of fifty-four inches per second. An additional packing density of 800 bits per inch may also be employed, as will be further described below.

Figure 4:
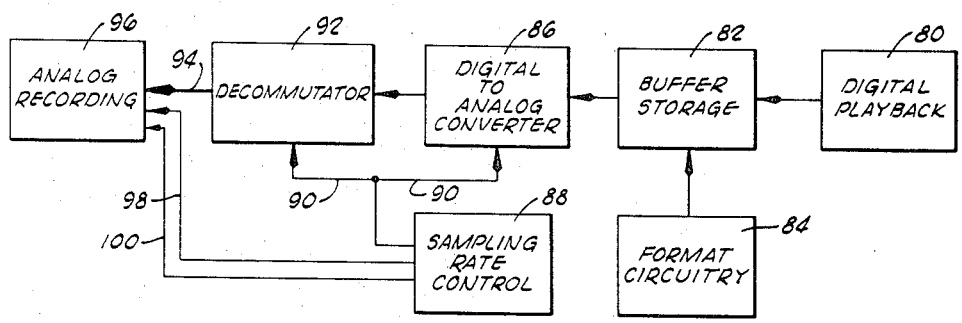
FIG. 4 is a functional block diagram which illustrates the digital to analog phase of the method.

FIG. 4 shows the digital playback phase of the method whereby previously digitized seismic records may be selected for playback as an analog display or other representation. In selecting a predetermined seismic record from a large reel of such records in digitized form, the operator employs a counter for rapid, automatic scan of the record to locate the identification word of the predetermined record, align the digital and analog systems for properly timed operation, and thereafter replay the digital record. A suitable digital playback mechanism 80 reads the digital tape to provide character sequential output to a buffer storage 82, an interlaced core-type storage similar to buffer storage 54 above; and format circuitry 84 controls the sequencing of the digital information through buffer storage 82 for eventual output to a digital to analog converter 86.

Once again the time interface is traversed as the time base or rate of data handling is translated; that is, the digital information being shifted out of buffer storage 82, under control of format circuitry 84, is serially placed in digital to analog converter 86 which comes under the control of a sampling rate control 88 which tracks with the real or actual seismic record time. The sampling rate control 88 provides the necessary scan and channel switching pulses on lines 90 for controlling digital to analog conversion and decommutation in converter 86 and a decommutator 92 at the proper real time rate. Sequentially converter multi-trace analog values are provided by the decommutator 92 on parallel outputs, shown as heavy line 94, to the analog recording mechanism 96. The sampling rate control 88 may contain suitable circuitry for providing a time break indication on line 98 and a 100 cycle per second or other reference timing signal on line 100. Thus, a finished analog record may take the same form as that shown in FIG. 2; however, the multi-trace seismic information can be further displayed or otherwise stored in any desired manner.

In a commercial installation, several components of the FIG. 1 and FIG. 4 phases may be the same equipments, reversible in operation. Thus, the analog transports 10 and 96, the digital recording and playback transports 58 and 80, the buffer storage elements 54 and 82, and the digital-analog converters may be the same equipments in an integrated data handling system as will be set forth below.

The performance of the method enables a large number of analog seismic field records or other analog replicas to be compactly stored on computer compatible tape for play back, digital processing and/or permanent storage without the need for the inclusion of real time registration or indication on the digital record. The real time of the seismic records is preserved through the rate and manner of the digital information handling through the intermediate buffer storage stages and the final digital recordings.

FIG. 5 shows one form of system for carrying out the method of the present invention. The block diagram of FIG. 5 illustrates analog equipment 110 which is suitable for inclusion in an overall system; the analog to digital and digital to analog sections of the system being more fully illustrated in FIGS. 6 and 7 to be described. The analog section 110 employs an analog transport 112 which is controlled by a highly accurate drum drive system 114. A suitable recorder drum drive system 114 is the particular subject matter of U.S. patent application Ser. No. 391,410, filed Aug. 24, 1964, entitled, "Motor Control Servo System," in the name of Brown et al. and assigned to the present assignee. Such a drive system exhibits characteristics whereby the wow and flutter is less than 0.5 percent peak to peak in the band of 2 to 200 cycles per second. The start time is very rapid, the recorder drums being brought to synchronous speed in less than one tenth of a second. It should also be understood that other recorder drum drive systems can be substituted so long as the requirements of accuracy and reliability are met.

The drum drive 114 provides rotational output on a primary drive shaft 116 to two different recording drums 118 and 120. The larger diameter transport drum 118 is designed for playback only of SIE-type tapes (Southwestern Industrial Electronics Corporation of Houston, Texas) which may be recorded either AM or FM. The smaller diameter drum 120 serves for either playback or recording of Techno-type tapes (Techno Instruments Company). Each of the drums 118 and 120 is preferably designed to handle 28 parallel channels of information and, therefore, each of the head banks 122 and 124 would provide 28 parallel transducing heads, each properly aligned with respect to the remainder. The outer end of primary drive shaft 116 is fitted with a suitable cam 125 for actuating a cam switch 126 to provide a zero time indication of analog transport 112 on a line 128 to a control unit 130. Control unit 130 would be integral with various interconnecting circuitry at the operating console to enable proper pre-adjustment of the system as will be further described.

The parallel group of reproducing heads 122 is connected by a heavy line 132, the heavy line indicating passage of plural, parallel channels of seismic information as well as time break and timing frequency pulse information, to a distribution network 134. Similarly, the heads 124 adjacent drum 120 are each connected through a cable 136 to the distribution network 134. Also, a return cable 138 supplies parallel leads of information from the distribution network 134 to the heads 124 for use in recording analog signals on drum 120. This recording function is that which is carried out during the second part, or the digital to analog phase, of the method as will be further described. The distribution network 134 serves to connect the various magnetic heads 122 and 124 to proper amplifiers. Since only twelve traces or channels (No. 1 through No. 12) will be converted on one revolution of the drums 118 or 120, a fast method of switching is needed so that the other twelve channels may be converted on the succeeding revolution. Such switching (relays or whatever) should be effected in the distribution network so that it may be used on either playback or records, as will be further described.

The distribution network 134 is connected through a plural channel cable 140 to a bank of parallel playback amplifiers 142. The amplifiers 142 are a conventional type in seismic work. The plural channel cable 140 conveys each of the seismic information channels as well as a time break channel and a timing signal channel to a respective amplifier in the playback amplifier bank 142. Similarly, a cable 143 conveys the same channels of information to respective demodulators in a bank of demodulators 144. The demodulator bank 144 would be utilized in the event that FM signals were being played back from the transport drum 118; otherwise, AM playback information is routed through cable 140 to the respective amplifiers of the bank of playback amplifiers 142.

At the output of the playback amplifier bank 142, the zero time pulse is routed on a lead 146 to the zero time switch 148; the amplified timing signals are routed on a lead 150 to the timing signal switch 152, and the plural channels of seismic information are routed on a cable 154 to data signal switches 156 (shown as a single switch contact for convenience). In the event of FM playback, alternative circuitry provides the zero time signal, the reference timing signal and the plural data signal channels on the respective leads 158 and 160 and cable 162 to the remaining contacts of the zero time switch 148, timing signal switch 152, and data signal switches 156, respectively.

The zero time pulse conducted through switch 148 can then be applied on lead 164 to a visual monitor 166. A second zero indication derived from cam switch 126 is also conducted from the control unit 130 on lead 167 for input to the visual monitor 166. The visual monitor 166 is preferably a multi-trace oscilloscope (sixteen traces) which enables visual comparison of the zero time switch pulse on lead 167 and the recorded zero or time break pulse from switch 148 and lead 164 so that the operator can ascertan exact coincidence between the zero time and the zero time switch pulse of the analog transport mechanism. The visual monitor 166 is also adapted to display the plural seismic trace signals at the same time as will be further described.

The timing signal from switch 152 is conducted on a lead 170 for amplification in the output amplifier bank 172. The amplified timing signals are also routed on a lead 174 for inspection on visual monitor 166, as required or selected, and a parallel output on lead 176 supplies the timing pulses to the analog to digital conversion system 180 (more particular subject matter of FIG. 6 to be described). A zero time switch or "start" indication, present on lead 168 from control unit 130, is also applied to the analog to digital conversion system 180.

The data signals from switches 156 are applied on a cable 182 to a group of parallel high cut filters 184. Twelve identical high cut filters, one receiving each of the seismic trace input channels on cable 182, will be required to prevent aliasing during the digitzing process. Such filters are well known in the geophysical prospecting art and would merely be a matter of design choice for installation of the proper elements in the system. The outputs from the twelve high cut filters are then applied in parallel through a cable 186 to respective output amplifiers in the output amplifier bank 172. The data output channels from output amplifier bank 172 are passed through a cable 188 to the analog to digital conversion system 180 for the data processing steps; and, for purposes of monitoring, the individual data channels are carried through parallel cable 190 for simultaneous display on the visual monitor 166 with the time break pulse and zero time switch indication.

In the digital playback mode, the digital to analog conversion system 200 (the more particular subject matter of FIG. 7) performs the requisite signal processing functions and provides analog signal outputs to the analog system 110. The zero time switch pulse present on lead 168 is also connected to the digital to analog conversion system 200 for system timing. The zero timing circuits from conversion system 200 provide a suitable zero time indication on lead 202; timing signals on lead 204, and twelve analog data signal trains in parallel through a cable 206. Each of these signal trains is applied to a respective record network in the record network bank 208; whereupon the amplified signals are conducted on cable 210 through the distribution network 134 to cable 138 for recording by the record heads 124 upon the Techno AM recording drum 120. The record networks 208 may be active or passive types, care being taken to provide sufficient output level to insure proper modulation of the AM tape on drum 120. The harmonic distortion of the record network from 5 cycles per second to 200 cycles per second should be held to less than 0.5 percent at the 100 percent modulation level, and less than 2 percent at the 200 percent modulation level.

FIG. 6 illustrates the analog to digital conversion equipment 180. Amplified multi-trace seismic information (the seismic data channels) are applied through cable 188 and the respective input leads 212 to the multiplexer 214. The reference frequency timing pulses are present on lead 176 to switch 216 which provides for their application via parallel leads 218 to a phase comparator 220 and a frequency comparator 222, both to be further described. Switch 216 is provided for connection to a lead 224 to an internal or self-contained timing oscillator 226 which can be employed in the event that the field recorded reference timing signal is lost or of poor fidelity.

The zero time pulse, a cam switch (126) indication actuated by the analog transport 112 (FIG. 5), is received on lead 168 for application to a sampling start control 228 which energizes or enables various frame rate circuitry so that signal processing will begin at a correct time. The sampling start control 228 may take various forms, all of which are often employed in the related art, and the enabling control is utilized so that the multiplexer sampling interval can be controlled to begin exactly at zero time without delay equal to a portion of the sampling interval. Thus, the sampling start control 228 is shown generally as enabling a frequency divider 229 receiving the output of a voltage controlled oscillator 230, an oscillator providing a selected output frequency, in this example, 3 kilocycles per second.

The voltage controlled oscillator or clock 230 provides a highly accurate scan frequency for controlling the multiplexer 214 and subsequent conversion circuitry to be described. Oscillator 230 is phase locked to the incoming 100 cycle per second reference signal, present on lead 176, by means of the phase comparator 220 and the frequency comparator 222. This is accomplished by feeding back a portion of the output signal from oscillator 230 on lead 232 to a 30:1 frequency divider 234. This frequency division provides a nominal 100 cycle per second signal upon lead 236 for application and comparison in each of the phase comparator 220 and the frequency comparator 222. The signal on leads 236 is compared with the incoming timing signal (lead 176) through switch 216 and parallel leads 218 to derive a pair of control voltages on each of leads 238 and 240 to the voltage controlled oscillator 230.

The frequency comparator 222, a well known type of control circuit, derives a D-C voltage proportional to the phase difference between the divided 100 cycles per second on lead 236 and the incoming reference timing signal on lead 218. This D-C voltage is then applied on lead 240 to make the necessary correction in the operation of voltage controlled oscillator 230. The phase comparator 220 compares the same input voltages, the divided 100 cycles per second on lead 236 and the input timing signal on lead 218, to derive a D-C voltage, polarity indicating phase direction, representative of frequency difference for application on lead 238 to further control the oscillator 230. Thus, oscillator 230 is corrected for large error by the frequency comparator 222 and, thereafter, for small error about the correct phase point by the phase comparator 220.

The voltage controlled oscillator 230 provides a nominal 3 kilocycle signal on lead 242 to a divider 244. The divider 244 is preferably a plural ratio divider operating at division ratios of 3:1, 4:1, 5:1, and 6:1 for providing a selection of scan frequency outputs. A scan frequency switch 246 provides selection of the scan frequency wherein the 3 to 1 division yields a 1000 c.p.s. signal on lead 248, 4 to 1 division yields a 750 c.p.s. signal on lead 250, 5 to 1 division provides 600 c.p.s. at lead 252, or 6 to 1 division provides a 500 c.p.s. selection on lead 254.

The output lead 256 then conducts the selected scan frequency signal to the multiplexer 214 and an analog to digital converter 258.

The multiplexer 214 may be a conventional type of multiplexer which accepts plural channel inputs and samples the plural channels consecutively and repeatedly to provide a single time-sequential output voltage representative of all channel information on a lead 260 to the analog to digital converter 258. The procedure utilizes burst scanning whereby a scan pulse on lead 256 enables multiplexer 214 to take a discrete sample of each of the plural inputs 212 and then stop, delivering the sequential samples on lead 260 to the analog to digital converter 258. The analog to digital converter 258 is also enabled by a scan pulse on lead 256 and it thereafter accepts the time sequential voltage on lead 260 for digitalization, whereby each discrete data value is converted to an 11 bit binary number.

The analog to digital converter 258 may be one of the well-known types of converter which provides binary digitalization to 11 bits, including sign, and provides an output per data value of 2 parallel characters in series, the characters being comprised of 5 and 6 bits each. A twelve to one counter 262 receives an input on lead 264 from the analog to digital converter 258 for the purpose of signalling the completion of digitalization and resetting the multiplexer 214 for its next succeeding sampling interval. That is, after 12 samples, one from each data channel, have been digitalized in the converter 258, the signal indication on lead 264 will complete a twelve-count in counter 262 to provide an output pulse on lead 266 as a reset to multiplexer 214. Thus, multiplexer 214 is once again prepared to accept the next succeeding scan frequency pulse on lead 256 which initiates the succeeding sampling sequence. That is, successive samples of each of the plural data input channels (leads 212).

Scan frequency pulses are selectable through switch 246 at rates of 1,000; 750; 600 and 500 cycles per second providing respective sampling intervals of 1, 1.33, 1.67 and 2 milliseconds. It should be understood that inputs 212 and multiplexer 214 are preferably controllable so that any plurality up to and including 12 data channels may be handled at the selected sampling rates. Further, it is foreseen that in special applications it might be desirable to sample at still higher rates per channel. This may be achieved by commutation to reduce the number of channels and increase the sampling rate per channel. Since that sampling rate would be the same for all information channels, this may be achieved by use of simple patchboards or adapter plugs to repeat certain channel scannings before the total channel scan is completed. Also, it would be within standard design practice to provide sample and hold amplifiers at the input 260 to the analog to digital converter 258. Such provision would assure simultaneous scan of the individual, discrete samples.

The binary coded digital output from analog to digital converter 258 is conducted on line 270 for input to an interlaced buffer storage, core storage 272. The core storage 272 is typically a 4096 x 8 core assembly which accepts the serial binary character signals on input lead 270 and thereafter shifts the sequential indications through storage to the digital write circuits 274. The digital write circuits 274 are controlled to record the binary coded digital information on a suitable recording medium carried by a digital tape transport 276. The rate of shifting of information out of core storage 272 is controlled by the format control 278 as it controls digital write circuits 274 in conjunction with a clock generator 280 to place the binary coded digital indications on the recording medium. A parity circuit 282 is included to insert proper odd parity bit values in core 272 with each binary data character. Longitudinal parity may also be inserted at the end of each record channel.

The buffer-tape storage assemblies and format or control logic circuitry as shown within the dash-line 284 is commercially available equipment. The Redcor Corporation of Canoga Park, Calif., provides a suitable rate buffer storage apparatus for such employment with the present system.

Another suitable buffer-tape data storage system for use in the buffer-tape storage 284 of the system is commercially available from the Ampex Computer Products Division of Culver City, Calif. The primary purpose of this buffer storage system is for enabling the recording of encoded digital data on computer compatible tapes. Such buffer storage systems operate upon their own time base relative to any digital information fed into the systems and they thereby eliminate any need for a subsequent step of format conversion to achieve computer compatibility.

While the tape speeds and packing densities are a matter of design choice, it has been found that the system operates to good advantage with packing densities of either 556 b.p.i. or 800 b.p.i. on one-half inch tape running at 54 inches per second. This allows for a format commonly termed the gapped, IBM compatible recording pattern. The system further utilizes the NRZI (non return to zero, inverted) type of recording which is also a well known IBM tape practice. With such recording procedures then, the resulting digital records and consequently, the digital files, are of finite length depending upon the choice of sampling rate, digital tape speed, packing density, and the size of the core storage buffer.

FIG. 7 illustrates the digital to analog conversion equipment 200 which is included in the system of FIG. 5. The digital playback equipment is located within a dash line 284 which represents the previously described, commercially available rate buffer storage system. A digital tape transport 290, adapted to carry previously recorded digital seismic information, presents the digital information for pick up through digital read circuits 292. The digital read circuits 292 pick up the sequentially recorded character information (in binary digital form) and conduct it into core storage 294. The order and rate of operation of transport 290 and digital read circuits 292 is controlled by format control 296 which is initiated by a pulse as derived from zero timing circuits 298 and conducted on lead 300. The zero timing circuits 298 also provide a suitable zero pulse on lead 202 for application back to the analog section 110 of the system (FIG. 5). The zero timing circuits 298 may take various forms, however, it is contemplated that the cam energized switch initiation at the analog transport 112 (cam switch 126) will suffice to provide the proper indication, a basic, suitable point from which all time relations should progress. The binary coded digital information from read circuits 292 is then placed in the core storage 294 in serial character form.

Once again, dash line 284 denotes buffer storage equipment which is common to both the analog to digital system 180 (FIG. 6) and the digital to analog system 200 (FIG. 7). That is, the digital tape transport 290, core storage 294, and other of the clocking and timing circuits of the control logic would be reversibly operable through both the digital write and digital read operations. Thus, the binary coded information read out of core storage 294 would progress to a digital to analog converter 134 at the same rate and order as it was applied into the core storage 272 and digital write circuits 274 during its digital storage. In this manner, the digital to analog converter 304 can be operated at the same data conversion rate to reconstruct the analog data value signals in their proper or real time relationships.

The output 306 from digital to analog converter 304 applies the sequential analog data values into a suitable decommutator 308; whereupon the multiple channels of analog seismic signals are conducted through parallel leads 310 and cable 206 to the recorder networks 208 in analog section 110 (FIG. 5). The decommutator 308 is a conventional type of de-multiplexing circuit.

The scan and channel switching pulses for the decommutator 308 are derievd from a precision oscillator 312. Oscillator 312 is preferably a crystal controlled oscillator, of high accuracy and reliability, providing a suitable output for dividing down to the requisite scan and channel switching frequencies. For example, oscillator 312 may provide an output frequency of 36 kilocycles which is applied to a first multiple ratio divider 316 and a parallel divider 318. The divider 318 operates at a 360:1 ratio to provide a 100 cycle per second output voltage which may be conducted back upon lead 204 as the timing signal for application to the analog recording transport 112. The divider 316, a multi-output divider at ratios of 3:1, 4:1, 5:1 and 6:1, provides a 12 kc. output on lead 320, a 9 kc. output on lead 322, a 7.2 kc. output on lead 324 and a 6 kc. output on lead 326. One of these outputs is selectable by means of the switch 328 for conduction on leads 330 and 332 as the channel switching frequency to the decommutator 308. The same voltage on lead 330 is also conducted through a 12 to 1 divider 334, the output of which is applied on lead 336 as the scan frequency voltage to decommutator 308. Thus, the same rates of scan and channel switching are selectable in the playback equipment for control of decommutator 308 as are employed in the analog to digital system of FIG. 6.

Referring again to FIG. 5, the reconstituted analog information, along with the proper zero time pulse and timing signals, are present on leads 202, 204 and cable 206 from the digital to analog conversion system 200. The leads 202, 204 and cable 206 are each applied to the record network bank 208 where each is individually amplified and/or biased for subsequent recording, the respective signals then being conducted in parallel through cable 210 to the distribution network 134. The proper selection of signal pairs through distribution network 134 will then apply the reconstituted analog signals through a cable 138 to fourteen adjacent heads of the head array 124 for recording on the drum 120 of analog transport 112. The final analog recording produced on the recorder drum 120 will include the multi-trace seismic information (twelve channels as disclosed here), as well as the time break or zero time pulse channel, and still another channel which contains the reference timing signal, a 100 c.p.s. alternating voltage.

While the present system has been disclosed with reference to the twelve-channel types of geophysical data handling equipment, it should be understood that the system can be applied equally as well in handling ten channel seismic information, ten channel systems also being prevalent in the art. The ten channel system is enabled by merely changing the various clock frequencies throughout the system, and it is foreseen that the actual system would provide both capabilities by merely changing the system timing at the operating console. For example, the distribution network 134 and its internal relay switching systems would be constructed in known manner for handling the requisite number of channels. In the analog to digital section 180, the timing may remain the same; however, the digital to analog conversion system 200 would require different channel and frame frequencies. These can be provided by providing the frequency of precision oscillator 312 at 30 kc. with respective channel frequencies of 10 kc., 7.5 kc., 6 kc. and 5 kc. provided at the input leads 320, 322, 324 and 326 of the selector switch 328. The proper ratio of frame frequency division will then follow by providing a further 10:1 divider in the stage 334.

*Operation*

In the operation of the system of FIG. 5, the operator first places his multi-trace seismic record with field recorded time break and timing pulses on the analog transport 112. Depending upon the field recording equipment, either the large diameter drum 118 (SIE, AM or FM) or the drum 120 (Techno AM drum) may be used in the signal processing procedure. In either event, the respective transducing head arrays 122 and 124 will be operatively positioned for signal pick up from their respective tape drums 118 and 120. It should also be noted that each of the drums 118 and 120 and the respective heads 122 and 124 provides for the handling of twenty-eight channels. This is often the format of analog information as it is brought in from the field. Therefore, since the processing system of FIGS. 5, 6 and 7 only provides for the handling of twelve seismic channels plus timing and time break channels (fourteen channels in all), a field tape must be run through twice; first, by running channels No. 1 through No. 14 through the processing system for a complete record playback or revolution of the recording drums, and then, by switching the heads No. 15 through No. 28 or other combinations into operative relationship and processing them in like manner. This switching can take place in the distribution network 134, either manually or automatically by actuation from the analog transport 112.

Assuming then, for the operational description, that the drum 120 is loaded with a field tape, fourteen of the heads 124 pick up signal voltages and apply them on cable 136 to the distribution network 134. Since this is an AM recording, the signals are routed through distribution network 134 and the cable 140 to respective playback amplifiers 142. Then, the data signals are conducted on cable 154 through the data signal switches 156 and high cut filters 184 to output amplifiers 172, and, finally, on cable 188 into the analog to digital conversion system 180. The timing signal is routed in parallel manner through the parallel timing signal switch 152 to a respective output amplifier in the output amplifier system 180.

The zero time switch 148 selects the zero time pulse read from the analog tape on drum 120, and thereafter connects this voltage on lead 164 to the visual monitor 166. The cam switch 126 generates a pulse at a predetermined revolution of the drum 120, and this pulse is also conducted via the control unit 130 and conductor 167 to the visual monitor 166. Here in the visual monitor 166 the actual start time of the system is aligned and actuated by the operator. This is instituted due to the fact that the time break pulse, as detected in the field, and thereafter recorded, is irregular or inconsistent in waveshape and is not suitable for direct application as a triggering means. Therefore, the operator lines up visually on monitor 166 the field or recorded time break pulse on lead 164 and the cam switch (126) indication present on lead 167 in order to get the best posssible starting time for each record playback. An operator may view the pulses repeatedly until he gets an accurate line up at which time the system is acuated to proceed with the analog to digital conversion and whatever the subsequent signal processing.

Once the operator has obtained his proper alignment, the control unit 130 is actuated to provide a start or zero time signal on the lead 168 to the analog to digital conversion system 180. Referring to FIG. 6, the zero time signal on lead 168 actuates the sampling start control 228 to enable scan frequency output from the voltage control oscillator 230 through divider 244 and the scan frequency switch 246. The scan frequency on lead 256, as selected by switch 246 in accordance with the particular data, is applied to the multiplexer 214 and analog to digital converter 258 to initiate their circuit functions. The plural channel seismic analog information present on cable 188 and input leads 122 to multiplexer 124 is sampled at the scan rate. That is, for each pulse of scan frequency applied to multiplexer 214, it scans through all of the channels once to take a sample and a time-sequential output of all samples is present on lead 260 to the converter 258. The 100 cycle per second timing signal present on lead 176 is compared in both the phase conmparator 220 and the frequency comparator 222 to derive the small and large timing errors which will show up as variations in the frequency of the timing signal (as recorded in field). These errors are then employed to control the voltage control oscillator 230 in such a manner that the scan frequency is varied accordingly, and thus the multiplexer 124 and analog to digital converter 258 are continually maintained in tracking relationship to the field record. Hence, any variations in recording speed in the field (or in the analog playback) are accounted for through the variable scan timing of the multiplexer 214 and the converter 258.

After the time-sequential analog values or samples are each converted to their digital equivalents, in binary coded digital form, and applied in sequence on lead 270 to the buffer storage and recording system 284. The digital data values on lead 270 are in binary form of 11 bits including sign, each value consisting of two sequential characters of 5 and 6 bits each. These successive binary characters are applied sequentially to the core storage 272 which shifts the binary information through the core storage and out to the digital write circuits 274. The format control 278 then controls the digital write circuits 274 to record the information in proper digital format on the recording medium carried by digital transport 276.

The core storage 272, being a sequentially interlaced buffer, can accept variable rate data, either synchronous or asynchronous. The utilization of such a buffer-tape storage system allows the recording of data presented at varying rates and far exceeds the recording capabilities of incremental tape transports; further, the record length and tape utilization can be adjusted to almost any desired value to accommodate the information recorded.

A completed digital tape, being in a format which is computer compatible, may then be transferred to a digital processing system wherein geophysical interpretation is carried out, or, the digital tape may be placed in permanent storage for retrieval and reconstitution to analog form at any later time. The digital tape, as previously described with relation to FIG. 3, is formatted to contain an identification block 62 (FIG. 3) wherein the operator can place a binary coded or decimal coded six digit number which serves as the serial or identification number of that particular seismic record. This identification word 62 is followed by an inter-record gap 64 and then a continuous digital record 66. The digital record 66 is recorded by positive or negative saturation in non-return to zero, inverted (NRZI) manner to place all sequentially sampled data values in serial form along the digital recording area 66. Each data value is comprised of two sequential characters, each character placed in parallel or transverse rows across the digital tape 60.

When it is desired to retrieve a particular seismic record from digital storage for representation or further processing in analog form, the operator places the appropriate digital tape reel on the digital tape transport 290 of FIG. 7 and thereafter rapidly scans, either automatically or by manual control, the sequential identification words until he arrives at that identification number representing the desired digital seismic information. Thereafter the system is energized by initiating all operation at a common zero point. This is done by referencing the system operation to the cam actuation of cam switch 126 on the analog transport 112.

Thus, upon actuation of cam switch 126, when the analog recorder drum 120 is at its zero point, the zero time pulse on lead 168 from control unit 130 is conducted to the zero timing circuits 298. The format control 296 enables digital read out by the digital read circuits 292 from the digital tape transport 290, and the digital indications are placed into the core storage 294. The sequential digital equivalents of data values are clocked through the core storage 294 and thereafter presented on output 302 for acceptance by the digital to analog converter 304. Digital to analog converter 304 is timed by the precision oscillator 312 and respective frequency dividers 316 and 334 to provide the same channel switching and scan frequency control signals as were employed in the original multiplexing of the information. Thus, the converter 304 provides an output of analog voltage (in their real or actual time relationship) to the decommutator 308 where each is then converted to its analog voltage value.

The parallel seismic analog voltages are then conducted through the parallel leads 310 and cable 206 to respective record networks in the record networks bank 208 (FIG. 5). A 100 cycle per second timing signal, divided down from the precision oscillator 312 in divider 318 (FIG. 7) is also conducted on lead 204 to one of the record networks 208, and a suitable zero time pulse from zero timing circuits 298 is supplied on conductor 202 to a record amplifier in the bank 208. These signals (twelve seismic data signals, a zero time pulse and a reference timing signals), are then applied in parallel through a cable 210 to distribution network 134. The distribution network 134 applies the parallel channels to cable 138; whereupon the analog seismic information is recorded by application to fourteen of the transducing heads 124 which are placed in operative relationship to the recording material upon recorder drum 120.

FIG. 8 represents equipment which would be used in conjunction with the system of FIG. 5 for adapting vibrational-type field records for analog to digital processing and storage. A field record 340 shows the manner in which analog seismic information would be recorded in response to a vibrational geophysical sounding. That is, the type of sounding wherein a controlled frequency vibration of known duration is introduced into the earth and the returned signals are detected and recorded for interpretive analysis. The multi-channel seismic record or twelve traces, channels 342, would be parallel recorded in known manner. Instead of a time break pulse, the equivalent or the vibrational signal input to the earth is recorded. This shows up as the signal 344, what is known as a vibrational upsweep, having a continually changing frequency, progressing from lower to higher frequencies, and having a known duration. A constant frequency timing signal 346 would still be recorded in the same manner to provide a timing error reference in the processing system of FIG. 5.

A plurality of data read heads 348 would be aligned with each of the data channels 342, each connecting its analog signal output on one of the parallel input leads 350 to a correlator 352. An additional transducer head 354 is aligned for pick up of the vibration replica signal 344, which analog signal is also conducted by a lead 356 to the correlator 352. The correlator 352 operates on each of the parallel signal channels in known manner to provide correlated signal output on each of the leads 358 through the cable 360. Such a correlator and correlation procedure is the particular subject matter of U.S. Patent No. 2,989,726 entitled "Method of and Apparatus for Determining the Travel Time of A Vibratory Signal Between Spaced Points" in the name of Crawford et al. and assigned to the present assignee.

The correlated data signals on leads 358 would each have its repetitive signal reflection events (i.e., the vibratory nature of the signal) removed in favor of time correlated signal pulse, the analog character of the voltages then being very much like explosive or single shot seismic records. The vibratory output signal 344 on lead 356 to correlator 352 would be correlated with a replica of its own configuration, thereby providing a single auto correlation pulse, the time position of which occurs at actual time zero. This time zero pulse output on lead 362 from correlator 352 could then be applied as the zero time pulse in setting the time base of the processing system (FIG. 5). Still another transducing head 364 is aligned to pick up the reference signal channel 346 to provide an output on lead 366. This signal on lead 366 would constitute a timing signal, having a constant frequency and amplitude, which could be employed throughout the analog to digital to analog system in the same manner as was disclosed in the prior descriptions (FIGS. 5, 6 and 7). Thus, the signal conductors 360, 362 and 366 might be applied to the distribution network 134 (FIG. 5) in the same manner as signal cables 132 or 136.

FIG. 9 illustrates an alternative form of digital to analog conversion system. The digital information could be read from storage in the same manner as previously set forth from a commercially available type of buffer-tape storage system 284. The digital voltage values from buffer-tape storage system 284 are then applied to a digital to analog converter 372 wherein the sequential digital data value, two serial characters of 5 and 6 bits each, are converted to analog voltage information which is present on the lead 374. A decommutator 376 accepts the analog information and separates the respective channels of information to provide a plurality of seismic signal outputs on the leads 378 to a suitable analog transport 380. The decommutator 376 and digital to analog converter 372 may be circuits similar to those employed in the system of FIG. 5; that is, state of the art circuitry. A suitable source of zero time reference is also derived for application and recording at the analog transport 380. This zero time reference is preferably obtained from a cam switch actuated at a predetermined position of the analog transport 380 as has been employed in the FIG. 5 system.

The system timing is supplied by a crystal oscillator 382, a precision oscillator which supplies a suitable basic frequency, for example, 30 kilocycles. The output of crystal oscillator 382 is applied on leads 384 to each of three divider stages 386, 388 and 390. The divider 386 is a plural ratio divider which provides outputs at 10 kc., 7.5 kc., 6 kc. and 5 kc. selectable by means of the rotary switch 392. The signal selected by the switch 392 is then conducted on a lead 394 to the decommutator 376 as the channel switching frequency. The same channel switching pulse from switch 392 is also applied to a divider 396, the output of which is applied on a lead 398 to decommutator 376 as the scan frequency. The divider 396 is plural ratio to provide either 10:1 or 12:1 division ratios, depending upon whether ten or twelve channel information is being processed.

The divider 388 provides two different outputs of 3 kc. and 2.5 kc. selectable by means of the switch 400 for application to a 2:1 divider 402. The output from the divider 402 is then applied on leads 404 to a first 2:1 divider 406 and a second 2:1 divider 408. The dividers 406 and 408 provide the proper frequency of output on leads 410 and 412 for controlling the speed of the analog transport 380. For ten channel signal processing the frequency is held to 750 c.p.s. which drives the analog transport 380 at 3.6 inches per second. In the case of twelve channel signal processing a frequency of 625 cycles is utilized to drive the analog transport 380 at 3 inches per second.

The analog transport 380 is driven through a rotary drive shaft 414 by a D-C synchronous drive system 416. Also keyed for rotation with the rotary drive shaft 414 is a 5000 count disc 418 which provides an indication of motor speed and phase accuracy or constancy. This indication is provided as a pulse voltage output on lead 420. The velocity comparator 422 receives inputs on lead 420 from the encoder disc 418 and on lead 410 from the divider 406 to perform a velocity comparison. That is, comparator 422 derives a control voltage proportional to the frequency difference between the signals on input leads 410 and 420 to produce a control voltage output on lead 424 to the D-C synchronous drive 416. In like manner, the phase comparator 426 compares the same signals present on leads 420 and 412 to derive a D-C voltage proportional to the phase difference of the input signals. This control voltage is applied on lead 428 to regulate the D-C synchronous drive 416. Thus, it can be said that the velocity comparator 422 serves to correct large variations in drive speed, as when the system is first starting up and coming to synchronism, and the phase comparator 426 takes over to continually track and reduce small speed errors. This drive system is similar to that disclosed in the aforementioned U.S application Ser. No. 391,410.

The divider 390 accepts the input from crystal oscillator 382 and divides at a ratio of 300:1 to produce a reference timing signal, 100 c.p.s. for the cases here disclosed, for application on lead 430 up to the analog transport 380 for recording thereon. As previously stated, a zero time pulse is also derived and processed for application to the analog transport 380 so that in later playback of the record produced by analog transport 380, the requisite number of signals will be available. That is, a plurality of seismic traces carrying the actual seismic record information; a 100 cycle per second timing signal which will serve to indicate any variations in playback transport speed, and finally, a suitable zero time indication for synchronizing the entire system for operation from a common time point. Various elements or timing circuits associated with the buffer-tape storage system 284 may be enabled or reset from the zero time indication; however, it should be understood that this is not a critical function since the buffer-tape systems 284 is a rate buffer, supplying its own time relations throughout the format sequencing and digital tape recording operation.

The operation of the alternative system of FIG. 9 is similar to that of FIG. 5 in the digital to analog mode. In the timing of the FIG. 9 system, the same channel switching frequency may be used for either the ten or twelve channel processing, but the analog transport is to be driven at different speeds. Thus, in the case of either ten or twelve channel processing, the selector switch 392 can be set to select a channel switching frequency, e.g. 10 kilocycles. This 10 kilocycle voltage is then applied on lead 394 as the channel switching frequency to digital to analog converter 372. In the case of ten channel processing, the divider 396 will provide a 10:1 ratio output on lead 398 as the scan frequency, and for twelve channel processing the divider 396 should operate at a ratio of 12:1.

The selector switch 400 provides speed control of the analog transport 380. Selection of the 3 kc. output voltage by the selector 400 provides a speed suitable for ten channel processing; that is, the 3 kc. signal is conducted through 2:1 divider 402 and each of the 2:1 dividers 406 and 408 for application leads 410 and 412 to the velocity comparator 422 and phase comparator 426. The frequency of the voltage on leads 410 and 412 is 750 cycles, a frequency which controls the D-C synchronous drive 416 to move the analog transport 380 at 3.6 inches per second. In the case of twelve channel processing, the switch 400 selects a 2.5 kc. voltage thereby providing a 625 cycle signal on leads 410 and 412 to the respective velocity and phase comparators 422 and 426 to drive the analog transport 380 at 3 inches per second. Hence, while the channel scanning frequency applied on lead 394 to the converter 372 is the same for both ten and twelve channel processing, the analog transport 380 is controlled to be driven at two different speeds to provide the required recording capacity.

The foregoing method and apparatus provides a means whereby multi-trace seismic records may be stored rapidly and in large quantity in digital format such that selected seismic record sections are readily accessible for retrieval and display, interpretive processing or whatever. The method employs rate buffer storage which is controlled asynchronously with respect to the analog seismic signal equipment and, by so doing, the need for digital or other time reference incorporated within the intelligence of the digital record is obviated. The system as disclosed herein deals to a great extent with twelve channel geophysical processing applications, this being a multiple of channels which finds wide acceptance. However, it should be understood that the various plural channel signal handling equipments can be constructed to include any reasonable number of channels to fulfill the desired function.

Changes may be made in the combination and arrangement of elements as heretofore set forth in this specification and shown in the drawings; it being understood that changes may be made in the embodiments disclosed without departing from the spirit and scope of the invention as defined in the following claims.

What is claimed is:

1. A method of processing multi-trace seismic signals comprising the steps of:
   receiving the multiple seismic traces and multiplexing said traces to form a time sequential analog voltage;
   converting said time sequential analog voltage to respective, sequential digital equivalents;
   controlling said multiplexing and analog to digital conversion at a rate referenced to the real time of said seismic signals;
   storing said successive digital equivalents in a manner whereby the real time of said seismic signals is recoverable from the spatial storage distribution of said digital equivalents.

2. A method of processing multi-trace seismic signals as set forth in claim 1 wherein said storing step comprises:
   applying said successive digital equivalents in real time to a buffer-type storage, such that the successive digital equivalents are shifted through the buffer storage and presented for storage in digital format, whereby the real time of the seismic signals exists as the format distribution of the successive digital equivalents.

3. A method of processing multi-trace seismic signals as set forth in claim 2 wherein playback of digital equivalent information is enabled by the further steps of:
   retrieving from storage in digital format the successive digital equivalents;
   applying the successive digital equivalents through a buffer storage;
   converting the successive digital equivalents to provide a time analog signal;
   decommutating said analog signal to provide plural channels each representing a seismic analog signal; and
   recording said plurality of seismic analog signals as a multi-trace seismic record at an accurate reproduction of the real time of said seismic signals.

4. A method of processing multi-trace seismic records comprising the steps of:
   deriving an analog voltage from each trace of said record;
   deriving a reference timing signal indicative of true field recording time of said multi-trace seismic record;
   sampling said analog voltages sequentially to produce a single time sequential analog voltage and converting said time sequential analog voltage to successive digital equivalents, said rates of sampling and converting being proportional to frequency variations of said reference signal; and
   storing said successive digital equivalents such that each is spatially disposed for retrieval in its proper field time relationship with respect to the first stored digital equivalent.

5. A method of processing multi-trace seismic records as set forth in claim 4 which is further characterized to include the steps of reversing the data conversion, comprising:
   retrieving said stored successive digital equivalents;
   converting said successive digital equivalents to provide time sequential analog voltage values;
   decommutating said analog voltage values to plural channels of analog voltage values;
   controlling the converting and decommutating at a rate proportional to said reference timing signal frequency; and
   transducing said plural channels of analog voltage values to a multi-trace seismic representation.

6. A method of processing multi-trace seismic records as set forth in claim 4 wherein:
   said sampling and analog to digital converting steps are initiated upon occurrence of the zero time of said multi-trace seismic record.

7. A system for processing multi-trace seismic signals comprising:
   mean for providing multi-trace seismic information consisting of a plurality of seismic analog signals, a zero time pulse, and a reference timing signal having a preset frequency which is frequency modulated by recorder speed errors;
   means for multiplexing said plurality of seismic analog signals to form a single time sequential analog signal;
   means for converting said time sequential analog signal to successive digital equivalents;
   means controlled by said reference signal and said zero time pulse for generating a scan frequency signal for controlling said means for multiplexing and means for converting; and
   means for receiving the successive digital equivalents from said means for converting and thereafter storing the same in a digital format wherein the real time of said multi-trace seismic signals is retained through the spatial placement of the successive digital equivalents with respect to the first stored digital equivalent.

8. A system for processing multi-trace seismic signals as set forth in claim 7 wherein said means for providing comprises:
   analog transport means for playing back field recorded multi-trace seismic information including channels containing said zero time pulse information and said reference timing signal;
   means disposed on said analog transport means for providing a signal indication of the zero time point of said analog transport; and
   means for comparing said zero time pulse and said signal indication to generate a start energization for application to said means for generating said scan frequency signal at the actual zero time of said multi-trace seismic information.

9. A system for processing multi-trace seismic signals as set forth in claim 8 wherein said means for generating said scan frequency signal comprises:
   a voltage controlled oscillator means receiving first and second control voltages at its inputs to provide an output signal at said scan frequency to control the means for multiplexing and means for converting;
   means for frequency dividing the output of said voltage controlled oscillator to provide a feedback signal at said preset reference timing frequency;
   frequency comparator means for comparing said reference timing signal and said feedback signal to derive said first control voltage proportional to frequency difference; and,
   phase comparator means for comparing said reference timing signal and said feedback signal to derive said second control voltage proportional to phase difference.

10. A system for processing multi-trace seismic signals as set forth in claim 7 wherein said means for storing comprises:
   core storage means for receiving the successive digital equivalents at its input and thereafter shifting the successive digital equivalents through storage; digital write means receiving said output digital equivalents from said core storage;

digital transport means in operative recording position to said digital write means; and format control means for controlling said digital write means and digital transport means to generate a digital record in computer compatible format wherein real time relationship of the seismic signals is retained through the spatial distribution of successive stored digital equivalents.

11. A system for processing multi-trace seismic signals as set forth in claim 8 which is further characterized to include means for providing retrieval of stored digital information, comprising:

means for reading out said stored digital information to generate said successive digital equivalents;

buffer storage means receiving at its input said successive digital equivalents as generated by said means for reading out and thereafter shifting said digital equivalents through storage to the output;

means for receiving said storage means output and converting said successive digital equivalents to provide an analog voltage output;

means for decommutating said analog voltage output to provide a plurality of analog voltage outputs; and means for applying said multiple analog signals for storage on said analog transport as a representation of multi-trace seismic information.

12. A system for processing multi-trace seismic signals as set forth in claim 11 wherein said buffer storage means comprises:

sequentially interlaced core storage means for receiving said digital information into core storage, and thereafter shifting the information through, the storage output being presented at the input of said means for converting at a rate equivalent to the real time of the multi-trace seismic signals being processed.

13. A system for processing multi-trace seismic signals as set forth in claim 11 which is further characterized to include:

oscillator means generating an output voltage having a predetermined, constant frequency;

frequency divider means receiving said oscillator output and providing plural outputs of different frequencies, each for selected application to said means for decommutating to control the channel switching frequency; and second frequency divider means also receiving said selected one of the plural outputs at its input and providing an output signal at a second divided frequency for application to said means for decommutating to control the scan switching.

14. A system for processing seismic records containing a plurality of channels carrying multi-trace seismic signals, a channel carrying zero time information, and a channel carrying a reference timing signal of predetermined frequency which varies with record speed errors, comprising:

analog transport means including a plurality of transducer heads in operative alignment for separate playback of said channels;

multiplexing means receiving the plurality of multi-trace seismic data signals at separate inputs to thereafter multiplex the plurality of signals to a time sequential analog voltage;

analog to digital converter means receiving said time sequential analog voltage samples and converting each to a binary coded digital equivalent in two serial characters;

oscillator means having its output frequency controlled to vary in proportion to variations in the frequency of said reference timing signal, the output of said oscillator means being applied to said multiplexing and analog to digital converting means as the scan timing voltage;

buffer storage means receiving said binary coded digital equivalent voltages at its input and thereafter shifting said digital information through storage;

digital tape transport means;

digital write means operatively aligned in recording relationship to said digital tape transport means for receiving the digital information from the output of said buffer storage means and recording said digital information; and format control and clock generator means for controlling said digital write means in a manner whereby said binary digital equivalents are recorded in a computer compatible digital format.

15. A system for processing multi-trace seismic signals as set forth in claim 14 which is further characterized to include means for providing retrieval of stored digital information, comprising:

means for reading out stored binary digital information from said digital tape transport means and providing an output to said buffer storage means;

digital to analog converter means accepting said binary coded digital equivalent information at its input and providing an analog voltage output;

decommutating means accepting the analog voltage output at its input and providing a plurality of outputs, each output carrying the analog voltage values for respective channels of seismic trace signals;

precision oscillator means providing an output voltage at a predetermined, constant frequency;

frequency divider means receiving said voltage of predetermined frequency at its input and providing multiple outputs at different division ratios, each selectable for application to control the channel switching of said decommutator;

second frequency divider means receiving said channel switching frequency voltage at its input and further dividing down the frequency to provide an output for application to control the scan of the decommutator;

third divider means receiving the predetermined, constant frequency signal at its input and providing an output signal having a frequency equal to said predetermined timing signal frequency; and means for routing said plural analog seismic signals, said zero timing indication, and said divided signal at said reference timing frequency to said analog transport means for recording in the original analog pattern.

16. A system for processing multi-trace seismic signals as set forth in claim 14 which is further characterized to include means for providing retrieval of stored digital information, comprising:

means for reading out stored binary coded digital information from said digital tape transport means and providing an output to said buffer storage means;

digital to analog converter means accepting said binary coded digital information at its input as it is shifted out of buffer storage, said converter means providing an analog voltage output;

decommutating means accepting said analog voltage output at its input and providing a plurality of outputs, each output carrying the analog voltage values for respective channels of seismic trace signals;

precision oscillator means providing an output voltage at a predetermined, constant frequency;

first frequency divider means receiving said precision oscillator means output and providing multiple frequency divided signals each selectable for application to said decommutator means as the channel switching signal;

second frequency divider means receiving said selected channel switching signal and dividing at a preset ratio to produce an output signal for application to said decommutator means as the scan control signal;

synchronous drive means for controlling the record speed of said analog transport means;

generator means synchronized with said record speed for providing an output signal having a frequency proportional to said record speed;

third frequency divider means receiving said precision oscillator means output and providing an output signal having a frequency which is produced by said generator means at a predetermined, desired record speed;

frequency comparator means for comparing the outputs from said generator means and said third divider means to develop a control voltage for gross control of the velocity of said synchronous drive means;

phase comparator means for comparing the outputs from said generator means and said third divider means to develop a control voltage for fine control of the velocity of said synchronous drive means;

means for applying said plurality of analog seismic outputs from said decommutating means to said analog transport for representation as a multi-trace seismic record.

17. A system for processing multi-trace seismic signals which are stored as a series of successive digital indications which comprises:

means for reading out said recorded digital indications to generate successive digital electrical signals;

buffer storage means receiving at its input said successive digital signals as generated by said means for reading out and thereafter shifting said digital signals through storage to the output at a constant rate;

means for receiving said storage means output and converting said successive digital equivalents to provide an analog voltage output;

means for decommutating said analog voltage output to provide a plurality of analog voltage outputs;

analog transport means; and means for applying said multiple analog signals for storage on said analog transport as a real time representation of multi-trace seismic information.

18. A system for signal processing as set forth in claim 17 wherein said buffer storage means comprises:

sequentially interlaced core storage means for receiving said digital information into core storage, and thereafter shifting the information through, the storage output being presented at the input of said means for converting at a rate equivalent to the real time of the multi-trace seismic signals being processed.

19. A system for seismic signal processing as set forth in claim 17 which is further characterized to include:

oscillator means generating an output voltage having a predetermined, constant frequency;

frequency divider means receiving said oscillator output and providing plural outputs of different frequencies, each for selected application to said means for decommutating to control channel switching; and second frequency divider means also receiving said selected channel switching frequency at its input and providing an output signal at a second divided frequency for application to said means for decommutating to control the scan switching.

20. A system for processing multi-trace seismic signals in the form of a digital record containing successive digital information units, comprising:

digital transport means for receiving said digital record;

means for reading out the successive stored digital information units and providing an electrical output;

buffer storage means receiving the successive digital electrical signals at its input and thereafter shifting said digital signals through storage to the output;

digital to analog converter means accepting said digital electrical signals at its input and providing an analog voltage output;

decommutating means accepting the analog voltage output at its input and providing a plurality of outputs, each output carrying the analog voltage values for respective traces of said multi-trace seismic signal;

precision oscillator means providing an output voltage at a predetermined, constant frequency;

first frequency divider means receiving said voltage of predetermined frequency at its input and providing multiple outputs at different division ratios, each selectable for application to control the channel switching of said decommutator means;

second frequency divider means receiving said channel switching frequency voltage at its input and further dividing down the frequency to provide an output for application to control the scan switching of said decommutator means;

analog transport means;

third frequency divider means receiving the output of said first frequency divider means at its input to provide an output reference signal having a constant, predetermined frequency; and means for recording each of said analog voltage outputs from said decommutating means and said third divider means output on said analog record transport means.

21. A system for processing multi-trace seismic signals as set forth in claim 7 which is further characterized to include:

a vibrational seismic record which includes multi-trace seismic information as derived from an input seismic signal of predetermined frequency and duration, a zero time pulse, and a reference timing signal having a preset frequency which is frequency modulated by recorder speed errors; and correlation means receiving each of said multi-trace vibrational seismic information signals to provide a multi-trace correlated output for application to said means for multiplexing.

References Cited
UNITED STATES PATENTS

| | | | |
|---|---|---|---|
| 3,018,959 | 1/1962 | Thomas | 340—172.5 X |
| 3,061,192 | 10/1962 | Terzian | 340—172.5 X |
| 3,134,957 | 5/1964 | Foote et al. | 340—15.5 |
| 3,241,100 | 3/1966 | Loofbourrow | 340—15.5 |
| 3,252,148 | 5/1966 | Mitchell | 340—15.5 X |
| 3,263,219 | 7/1966 | Burn et al. | 340—172.5 |
| 3,281,839 | 10/1966 | Triest et al. | |

BENJAMIN A. BORCHELT, *Primary Examiner.*

R. M. SKOLNIK, *Assistant Examiner.*